Figure 1:
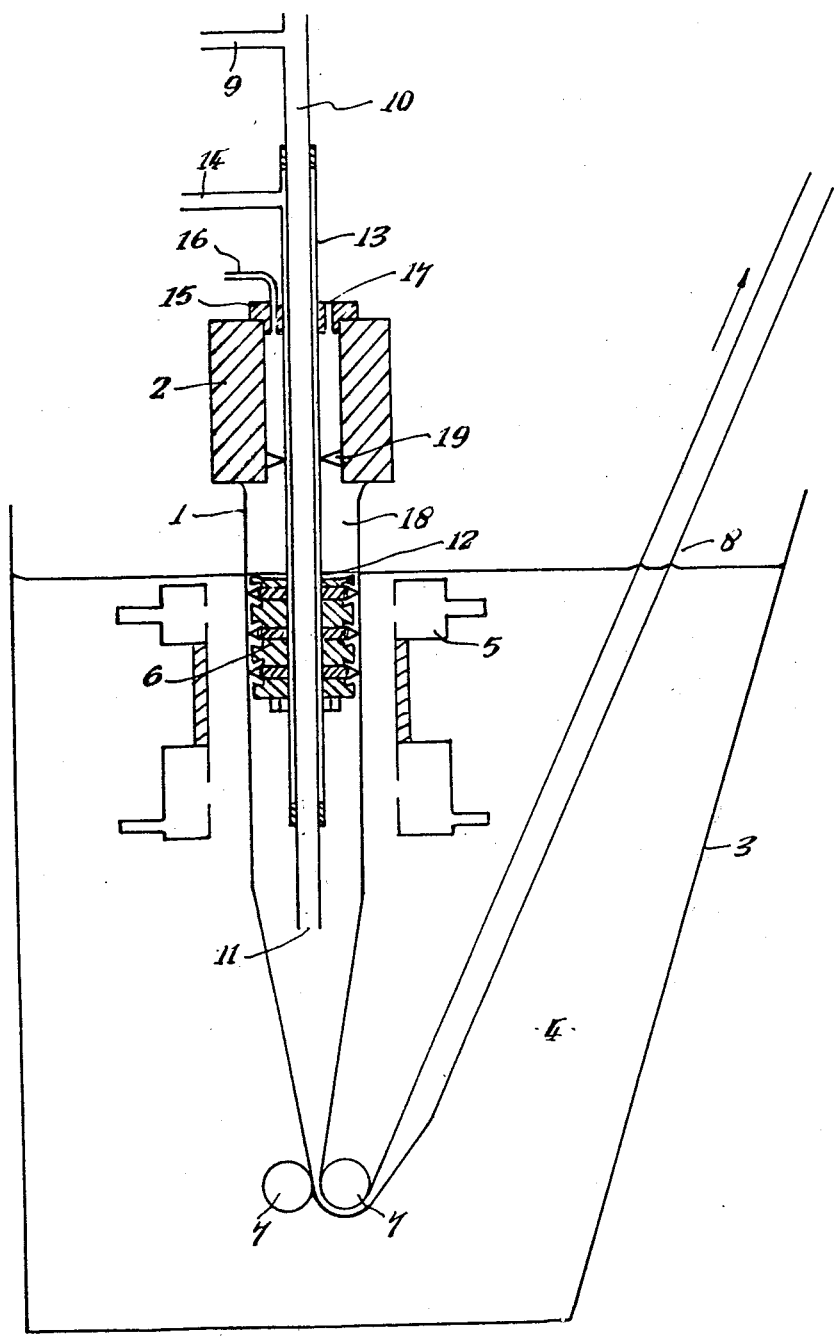

United States Patent [19]

Jack et al.

[11] 4,294,796

[45] * Oct. 13, 1981

[54] EXTRUSION PROCESSES AND APPARATUS FOR QUENCHING TUBES

[75] Inventors: James Jack, Mistley; Derek C. Gray, Colchester, both of England

[73] Assignee: BXL Plastics Limited, London, England

[*] Notice: The portion of the term of this patent subsequent to Aug. 24, 1993, has been disclaimed.

[21] Appl. No.: 5,231

[22] Filed: Jan. 22, 1979

[30] Foreign Application Priority Data

Oct. 15, 1973 [GB] United Kingdom ............. 48047/73

Related U.S. Application Data

[63] Continuation of Ser. No. 903,914, May 8, 1978, abandoned, which is a continuation of Ser. No. 514,801, Oct. 15, 1974, abandoned.

[51] Int. Cl.³ .................................................. B29D 7/20
[52] U.S. Cl. ............................ 264/559; 264/560; 264/562; 425/71; 425/93; 425/96; 425/326.1; 425/378 R

[58] Field of Search ............... 264/562, 559–560, 264/565–566; 425/71, 326.1, 93, 96, 378 R

[56] References Cited

U.S. PATENT DOCUMENTS

| | | | |
|---|---|---|---|
| 2,987,767 | 6/1961 | Berry et al. | 264/565 |
| 3,008,185 | 11/1961 | Goldman | 264/566 |
| 3,142,092 | 7/1964 | Ralston | 264/178 R |
| 3,468,995 | 9/1969 | Nelson | 264/209 |
| 3,796,781 | 3/1974 | Edwards et al. | 425/326.1 |
| 3,976,410 | 8/1976 | Jack et al. | 425/71 |

*Primary Examiner*—Jeffery R. Thurlow
*Attorney, Agent, or Firm*—Brisebois & Kruger

[57] ABSTRACT

Apparatus as set forth in U.S. Pat. No. 3,796,781 for the production of quenched tubes of plastics materials, wherein the peripheral portions of the calibrating disc assembly that contact the wall of the tube during operation of the apparatus comprise a liquid absorbent material.

13 Claims, 2 Drawing Figures

EXTRUSION PROCESSES AND APPARATUS FOR QUENCHING TUBES

This is a continuation, of application Ser. No. 903,914, filed May 8, 1978, now abandoned which was a streamline continuation of application Ser. No. 514,801, filed Oct. 15, 1974 now abandoned.

This invention relates to apparatus for use in the production of quenched organic thermoplastic polymeric material and is an improvement in or a modification of the invention described and claimed in U.S. Pat. No. 3,796,781 Edwards et al, the disclosure of which is herein incorporated by reference.

U.S. Pat. No. 3,796,781 describes a process for quenching a continuously extruded tube of organic thermoplastic polymeric material which comprises leading the tube from the die of an extrusion machine vertically downward into a quenching bath while bathing the inner surface of said tube with a quenching liquid which is circulated through said tube by feeding liquid continuously into the tube said liquid rising in the tube and passing continuously through an assembly of two or more calibrating discs which are disposed perpendicularly to the axis of the tube and which are mutually coaxial with each other as well as with the extruded tube and which discs are so shaped and assembled together as to prevent the formation of stagnant regions in the liquid, to a selected level lying above the uppermost level of the assembly of calibrating discs and withdrawing said liquid by suction means which maintains said liquid at said selected level, and which comprises causing the tube to change its direction of travel from a vertically downward direction to an upward direction of travel in the quenching bath after it has passed through a pair of nip rollers which flatten the tube across only part of its width and driving or drawing the tube from the quenching bath.

This Patent also describes apparatus for use in the process comprising a downwardly extruding tube extrusion die, a quenching bath, as assembly of calibrating discs which are disposed perpendicularly to the axis of the tube and which are mutually coaxial with each other as well as with the axis of the tube and which assembly is supported by a tubular structure attached to and passing through the mundrel of the extrusion die, the assembly being so formed that liquid can pass therethrough without stagnant regions being formed, means for passing quenching liquid continuously through the tubular structure into the interior of the tube at a level below that of the lowermost of the calibrating discs, suction means for continuously removing this liquid at a selected level above the upper most level of the assembly of calibrating discs, means for controlling a gas pressure in the space enclosed by the die, the thermoplastics tube and the surface of the quenching liquid within the tube, a pair of nip rollers which flatten the tube across only part of its width and which enable the direction of travel of the tube to be changed from a vertically downward direction to an upward direction of travel in the quenching bath and means for taking the tube from the quenching bath to a point where it is batched or is subjected to additional treatment.

It has been found that when the process is used for the production of tubes from thermoplastics materials that do not contain such lubriceous additives as, for example, antistatic agents, slip agents and antiblock agents, especially electrical grade materials such as electrical grade polypropylene, the tube tends to be dragged very closely over the discs of the former so that considerable scratching of the inner surface of the tube may occur. When the tube is subsequently blown to form film the scratch marks become very noticeable and the film is useless for many applications where the appearance of the film and high electrical quality are important. In addition the scratches form weak points in the tube and this may cause a bubble blown in the tube to burst with the consequent hold up in production of film.

This invention provides an improved or modified apparatus of the type described in U.S. Pat. No. 3,796,781 which enables the process to be used for the production of quenched tubes of thermoplastic polymeric material containing no lubriceous additives and also provides a process for the production of quenched tubes using the apparatus.

According to U.S. Pat. No. 3,796,781 the calibrating discs, at their point of contact with the tube, are preferably as thin as is consistent with adequate support of the tube. The discs are preferably made from a metal or from a filled or unfilled fluorinated plastics material.

This invention is based on the observation that scratching of the tube can be greatly reduced or elminated if, instead of the metal or fluorinated plastics discs, discs are used of which at least the peripheral portions that contact the wall of the tube comprise a liquid-absorbent material.

The liquid-absorbent material may be, for example, a natural or synthetic open pore sponge material, for example sponge rubber, polyurethane or polyvinyl chloride, porous leather, open pored sintered metals, cloth, for example as layered pads or laminates, rope, string or cord, open pore minerals, for example, chalk or, paper, or cardboard, but is preferably a felt. As examples of felts there may be mentioned RGP felt or Mardite felt both supplied by Bury & Masco Industries Ltd, Bury, Lancs. As used herein, the term "soft, liquid absorbent material" means a compressible material which cannot scratch the interior of the tube and which has liquid absorbing characteristics like those of natural and synthetic open pore sponge material, porous leather, cloth, rope, string or cord, paper, or cardboard, or felt, and similar compressible liquid absorbent materials.

The discs may comprise a core of metal carrying a peripheral band of liquid-absorbent material but preferably they comprise a disc of absorbent material supported on both sides by a rigid material. In those cases where the absorbent material is itself sufficiently rigid to at least substantially retain its shape while the tube is passed over the discs, it may be possible to dispense with rigid supports.

It is believed that the quench liquid saturates the absorbent material and provides a lubricating layer of liquid between the disc and the tube. The thickness of the absorbent material should be such as to ensure adequate support for the tube and adequate lubrication for the tube and this can easily be established for any given material by trial and error.

The invention will now be described in greater detail by way of example with reference to the accompanying drawings of which FIG. 1 shows one form of apparatus in accordance with U.S. Pat. No. 3,796,781; and FIG. 2 shows an assembly of calibrating discs for use in an apparatus according to the invention.

Referring to FIG. 1, a thermoplastics tube 1 is extruded from a die 2 which is fed by a suitable extrusion machine. The hot tube 1 proceeds vertically downwards into quenching liquid 4 contained in the quench bath 3. Surrounding the tube 1 is sleeve 5 through which liquid is pumped to provide a moving stream of liquid passing over the outer surface of the tube 1. Such water is passed back into sleeve 5. The means for effecting this passage of liquid from and to the sleeve 5 is not shown. The sleeve 5 can be the type described in British Pat. No. 1,102,076. The tube 1 passes vertically downwards over an assembly 6 of calibrating discs to a pair of nip rollers 7 which flatten the tube over only a part of its width and is then taken upwards to emerge from the quenching liquid 4 at point 8. The assembly 6 of calibrating discs is mounted on a tube 13 within which is fixed a second tube 10. Sealing means are provided to close, at each end of tube 10, the annulus formed by the two tubes 10 and 13 which are arranged to be concentric.

Figure 2:
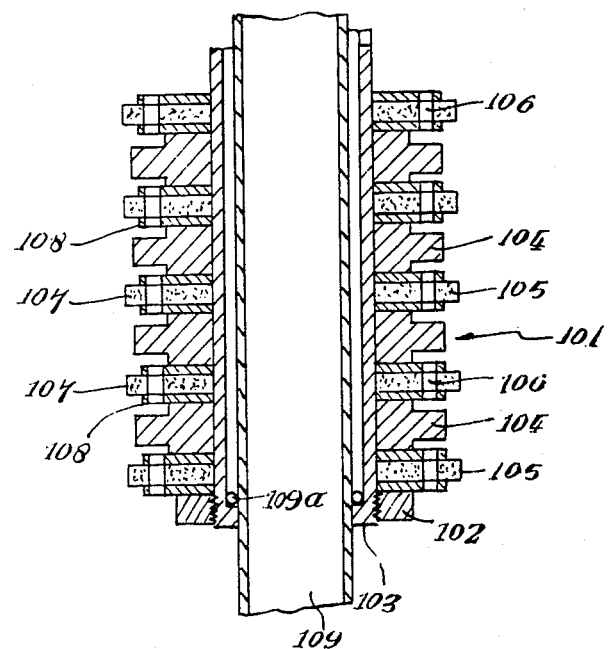

As shown in FIG. 2 the assembly of calibrating discs indicated generally as 101 comprises a nut 102 in threaded engagement with tube 103. Tube 103 passes coaxially through an alternating sequence of baffle discs 104 and calibrating discs 106. The calibrating discs 106 have a number of holes 106 circumferentially disposed near their peripheries. The whole assembly is clamped together as described with reference to FIG. 2 of U.S. Pat. No. 3,796,781, by a further baffle disc (not shown) which is screw-threaded onto tube 103 above the top calibrating disc. The calibrating discs 106 each comprise a layer of felt 107 sandwiched between two aluminium plates 106. The tube 103 is in sealed engagement with tube 109 via O-ring 109a.

The remaining features of the apparatus and the operation of the process are as described in U.S. Pat. No. 3,796,781.

The following Example illustrates the invention.

EXAMPLE

A tube of polypropylene resin (Grade PIC 3391 as manufactured and sold by ICI Ltd) was extruded from a 2-inch diameter annular extrusion die fed by a 3-inch extruder worlding at an output rate of 50 lb/hr. The temperature of the tube leaving the die was approximately 200° C.

Quenching of the extruded tube was achieved employing apparatus as described with reference to the drawings and the remaining features of which and operation of which were generally as described in the Example of U.S. Pat. No. 3,796,781 with the following conditions prevailing:

The calibrating discs each comprised 1.85-inch diameter discs of RGP felt of thickness ⅛-inch supported on each side by aluminium discs of diameter 1.6-inch and thickness 1/32-inch adhered thereto by means of Silastic 140 RTV (an adhesive supplied by Dow Corning Corporation and believed to be based on silicone rubber). The alminium discs and felt were provided with concentric ⅛-inch holes at a specing of ¼-inch centers which centers were spaced 3/32-inch inside the edges of the aluminium discs. Five of these composite calibrating discs were collated in alternating fashion as shown with 1.6-inch diameter brass baffle discs each of thickness ¼-inch and having a peripheral 3/16-inch rebate on each side leaving a ⅛-inch thick peripheral portion. The collation of alternate calibrating discs and baffle discs were clamped together on the centre tubular assembly, between a brass threaded baffle disc surmounting the above described collation and a brass terminal nut. The threaded baffle disc was shaped to have a flat side to contact the uppermost calibrating disc and an upward facing side comprising a centre portion parallel to the opposite side and a peripheral inclined portion such that over this portion the disc increased in thickness constantly towards the peripheral edge, thus providing a wier. The diameter of the threaded baffle disc was equal to that of the other baffle discs and the peripheral weir portion was of width ¼-inch, the minimum thickness being ⅛-inch and the maximum thickness being ¼-inch.

Internal quench liquid: water
Internal quench liquid temperature: 10° C.
Internal quench liquid flow rate through and over calibrating discs: 3 to 4 gals/min
External quench liquid: water
External quench liquid temperature: 10° C.
External quench liquid flow rate through sleeve: 2 to 3 gals/min
Inside diameter of sleeve: 3.0 inches
Quench nip roller speed: 15 ft/min
Quench tube wall thickness: 0.010-inch The level of quenching liquid inside the extruded tube was arranged such that the uppermost peripheral region of the top threaded baffle disc acted as a weir over which the quenching liquid poured prior to being withdrawn by suction.

The quenched tube thus produced was then subjected to a conventional bubble blowing process and thus converted into a balanced biaxially oriented film of nominal thickness 0.3 mil. It was found the bubble blowing process employed is producing such films could be sustained for much longer periods than it could when the extruded tube was quenched employing a similar calibrating disc assembly under similar conditions but replacing the aluminium disc supported felt calibrating discs by similarly shaped and drilled solid brass calibrating discs but having their peripheries bevelled to provide a minimum of coatact area with the extruded tube wall. Further, the film products obtained from the tube quenched is accordance with this invention were far superior to those produced from tube quenched employing the solid brass calibrating discs of U.S. Pat. No. 3,796,781, particularly is so far as the former films, unlike the latter, were substantially free from any visible scratches.

We claim:

1. In an apparatus for use in the production of a quenched tube of organic thermoplastic polymeric material comprising a downwardly operating extrusion die, a quenching bath, an assembly of calibrating discs which are disposed perpendicularly to the axis of the tube and which are mutually coaxial with each other as well as with the axis of the tube and which assembly is supported by a tubular structure attached to and passing through the mandrel of the extrusion die, means for passing quenching liquid continuously through the tubular structure into contact with the inner surface of the tube at a level below that of the lowermost of the calibrating discs, suction means for continuously drawing the same liquid upwardly as a continuous column within said tube to a selected level above the uppermost level of the assembly of calibrating discs and for removing said liquid upwardly from said selected level, means for controlling a gas pressure in the space enclosed by the die, the thermoplastics tube and the surface of the quenching liquid, a pair of nip rollers which flatten the tube across only part of its width and which enable the direction of travel of the tube to be changed from a vertically downward direction to an upward direction of travel in the quenching bath and means for taking the tube from the quenching bath to a point where it is batched or is subjected to additional treatment, the improvement whereby at least the peripheral portions of all of the calibrating discs that in operation contact the wall of the tube comprise a soft, liquid absorbent material.

2. Apparatus as claimed in claim 1, wherein the soft, liquid absorbent material is an open pore sponge material, porous leather, cloth, rope, string or cord, paper or cardboard.

3. Apparatus as claimed in claim 1, wherein the soft, liquid abosrbent material is a felt.

4. Apparatus as claimed in claim 1, wherein the calibrating discs comprise a rigid central portion and a peripheral portion of soft, liquid absorbent material.

5. Apparatus as claimed in claim 4, wherein the calibrating discs comprise a central core of rigid material surrounded by a peripheral band of soft, liquid absorbent material.

6. Apparatus as claimed in claim 4, wherein the calibrating discs comprise a disc of soft, liquid absorbent material, the central portion of which is supported on both sides by a rigid material.

7. Apparatus as claimed in claim 6, wherein the calibrating discs comprise a disc of felt sandwiched between two discs of lesser diameter made from a rigid material.

8. In a process for quenching a continuously extruded tube of organic thermoplastic polymeric material which comprises the steps of leading the tube from the die of an extrusion machine vertically downward around an assembly of a plurality of calibrating discs which are positioned coaxially of said tube and perpendicular to the axis thereof into a quenching bath, while bathing the inner surface of said tube with a quenching liquid which is circulated through said tube by first forming a body of liquid in contact with said inner surface beneath said assembly, causing the liquid in said body to rise in a continuous column within said tube to a selected level lying above the top of said assembly while remaining in contact with said inner surface between the discs of said assembly and at said selected level above said assembly, and withdrawing said liquid upwardly from a point above said assembly by suction means which maintains said liquid at said selected level, causing said tube to change its direction of travel from a vertically downward direction to an upward direction of travel in the quenching bath after it has passed through a pair of nip-rollers which flatten the tube across only part of its width, and withdrawing the tube from the quenching bath, the improvement which comprises the step of forming a lubricating layer of quenching liquid between the periphery of each disc and the wall of the tube by causing said liquid to saturate at least peripheral portions of the calibrating discs that contact the wall of the tube, which portions are made of a soft, liquid absorbent material so that a lubricating layer of quenching liquid is continuously in contact with the inner surface of said tube from a point below to a point above said discs.

9. In an apparatus for use in the production of a quenched tube of organic thermoplastic polymeric material comprising a downwardly operating extrusion die, a quenching bath, an assembly of calibrating discs which are disposed perpendicularly to the axis of the tube and which are mutually coaxial with each other as well as with the axis of the tube and which assembly is supported by a tubular structure attached to and passing through the mandrel of the extrusion die, means for passing quenching liquid continuously through the tubular structure into contact with the inner surface of the tube at a level below that of the lowermost of the calibrating discs, suction means for continuously drawing the same liquid upwardly as a continuous column within said tube to a selected level above the uppermost level of the assembly of calibrating discs and for removing said liquid upwardly from said selected level, means for controlling a gas pressure in the space enclosed by the die, the thermoplastics tube and the surface of the quenching liquid, a pair of nip rollers which flatten the tube across only part of its width and which enable the direction of travel of the tube to be changed from a vertically downward direction to an upward direction of travel in the quenching bath and means for taking the tube from the quenching bath to a point where it is batched or is subjected to additional treatment, the improvement whereby all of the calibrating discs that in operation contact the whole of the tube comprise a rigid central portion and a peripheral portion of soft, liquid absorbent material.

10. Apparatus as claimed in claim 9, wherein the calibrating discs comprise a central core of rigid material surrounded by a peripheral band of soft, liquid absorbent material.

11. Apparatus as claimed in claim 9, wherein the calibrating discs comprise a disc of soft, liquid absorbent material, the central portion of which is supported on both sides by a rigid material.

12. Apparatus as claimed in claim 11, wherein the calibrating discs comprise a disc of felt sandwiched between two discs of lesser diameter made from a rigid material.

13. Apparatus as claimed in claim 12, wherein the discs made from the rigid material are aluminum discs.

* * * * *